United States Patent
Balmakhtar et al.

(10) Patent No.: US 11,902,152 B2
(45) Date of Patent: Feb. 13, 2024

(54) SECURE ENCLAVE OF UE ROUTE SELECTION POLICY RULES IN THE 5G DEVICE OR NETWORK SLICING

(71) Applicant: T-Mobile Innovations LLC, Overland Park, KS (US)

(72) Inventors: Marouane Balmakhtar, Fairfax, VA (US); Gregory Schumacher, Holliston, MA (US)

(73) Assignee: T-Mobile Innovations LLC, Overland Park, KS (US)

( * ) Notice: Subject to any disclaimer, the term of this patent is extended or adjusted under 35 U.S.C. 154(b) by 166 days.

(21) Appl. No.: 17/510,021

(22) Filed: Oct. 25, 2021

(65) Prior Publication Data

US 2023/0128763 A1 Apr. 27, 2023

(51) Int. Cl.
*H04L 45/302* (2022.01)
*H04L 9/32* (2006.01)
*H04L 9/40* (2022.01)

(52) U.S. Cl.
CPC .......... *H04L 45/306* (2013.01); *H04L 9/3242* (2013.01); *H04L 63/123* (2013.01)

(58) Field of Classification Search
CPC .... H04L 45/306; H04L 9/3242; H04L 63/123
See application file for complete search history.

(56) References Cited

U.S. PATENT DOCUMENTS

2020/0359295 A1* 11/2020 Huang-Fu .............. H04W 80/10
2022/0038986 A1* 2/2022 Soliman .............. H04W 40/246

* cited by examiner

*Primary Examiner* — Duc C Ho
(74) *Attorney, Agent, or Firm* — Shook, Hardy & Bacon L.L.P.

(57) ABSTRACT

System and method for creating a secure enclave for User Equipment Route Selection Policy (URSP) rules in User Equipment (UE) in 5G to prevent malicious tampering and modification of the URSP rules. When the URSP rules are changed, a request is sent to receive a new set of URSP rules or receive an update of the URSP rules.

16 Claims, 4 Drawing Sheets

SECURE ENCLAVE OF UE ROUTE SELECTION POLICY RULES IN THE 5G DEVICE OR NETWORK SLICING

CROSS-REFERENCE TO RELATED APPLICATIONS

None.

BACKGROUND

The user equipment (UE) can be considered the weakest link in the 5G network chain because it is simply the only equipment that the end user can physically touch and control, opening the door to bad actors compromising one of the very foundational elements that must exist to connect users. At the same time, the UE plays a major role in completing the story of 5G network slicing by adding UE Route Selection Policy (USRP) Rules at the device level to dynamically route traffic to associated network slices. In other words, the expansion of network slicing beyond the 5G core network (5GCN), which includes edge and/or data center to cell site (RAN) to the user device (UE), necessitates a different approach to security.

Every 5G device will support URSPs and will have URSP rules provisioned in some form, even in a very basic form. This leads to opening further business avenues for mobile operators to improve on how they commoditize their various network services and offerings. All device vendors, OEMs (in general) and mobile operators have to work together to ensure URSP security is designed-in rather than created as an afterthought. 5G brings great flexibility in both the network and the device to intelligently route traffic and offer better quality of experience to users in terms of ease of access to various services/applications per user requirements. These rules offer information as to which PDU session (or flows on a network slice) a given service/application should use when it is activated. User devices use URSP rules to determine whether a new PDU session needs to be established for outgoing traffic or whether the packet traffic is to be routed to an established PDU session/flow. Note: The 5G core network has a corresponding set of rules to route downstream traffic destined to the device.

The URSP rules can be subject to malicious tampering or modification in the user device (e.g., modified for malicious traffic on authorized slices and Data Network Name (DNN)) (different flows), which can form a step in further cyber-attacks against the 5G network and other slice/DNN related infrastructure outside of the 5G network. Any malicious activity on the UE device can also possibly have implications on the mobile operator's network if compromised UEs attempt unauthorized access to slices, DNN, networks, etc., where the UEs do not have authorization or the UEs use the network in an unauthorized manner. Even though the network can block unauthorized access in this scenario, UEs may still create a distributed denial of service (DDOS) attack experience, which could prevent legitimate users from accessing their authorized slices or firewalls, which will be required for every flow set up by the UE. Other security threats could also be experienced such as a Man-In-The-Middle (MITM) attack, service interruption, service misuse, and service specific attacks, to state a few.

SUMMARY

A method and system for User Equipment (UE) route selection policy (URSP) rule security is provided to prevent malicious tampering or modification in the UE. A set of URSP rules is received with traffic descriptors with criteria for matching the URSP rules to a packet sent by the UE. The criteria is based on a data network name (DNN), Application Identity (ID), fully qualified domain name (FQDN), internet protocol (IP)-Tuple, or other criteria. Every time a packet is prepared for transmission, the URSP rules are validated by the UE before a match of the URSP rules is made to a protocol data unit (PDU) session. Content and signature of the URSP rules are verified that the URSP rules have not been altered. An unaltered set of URSP rules has a known good hash signature. The known good hash signature is created with a hashed message authentication code (HMAC). If the URSP rules cannot be verified, a core network is accessed by the UE to request an update to the URSP rules. If the URSP rules are verified, the URSP rules are matched to the PDU session.

BRIEF DESCRIPTION OF THE DRAWINGS

Illustrative embodiments of the present invention are described in detail below with reference to the attached drawing figures, and wherein.

DETAILED DESCRIPTION

Figure 1:
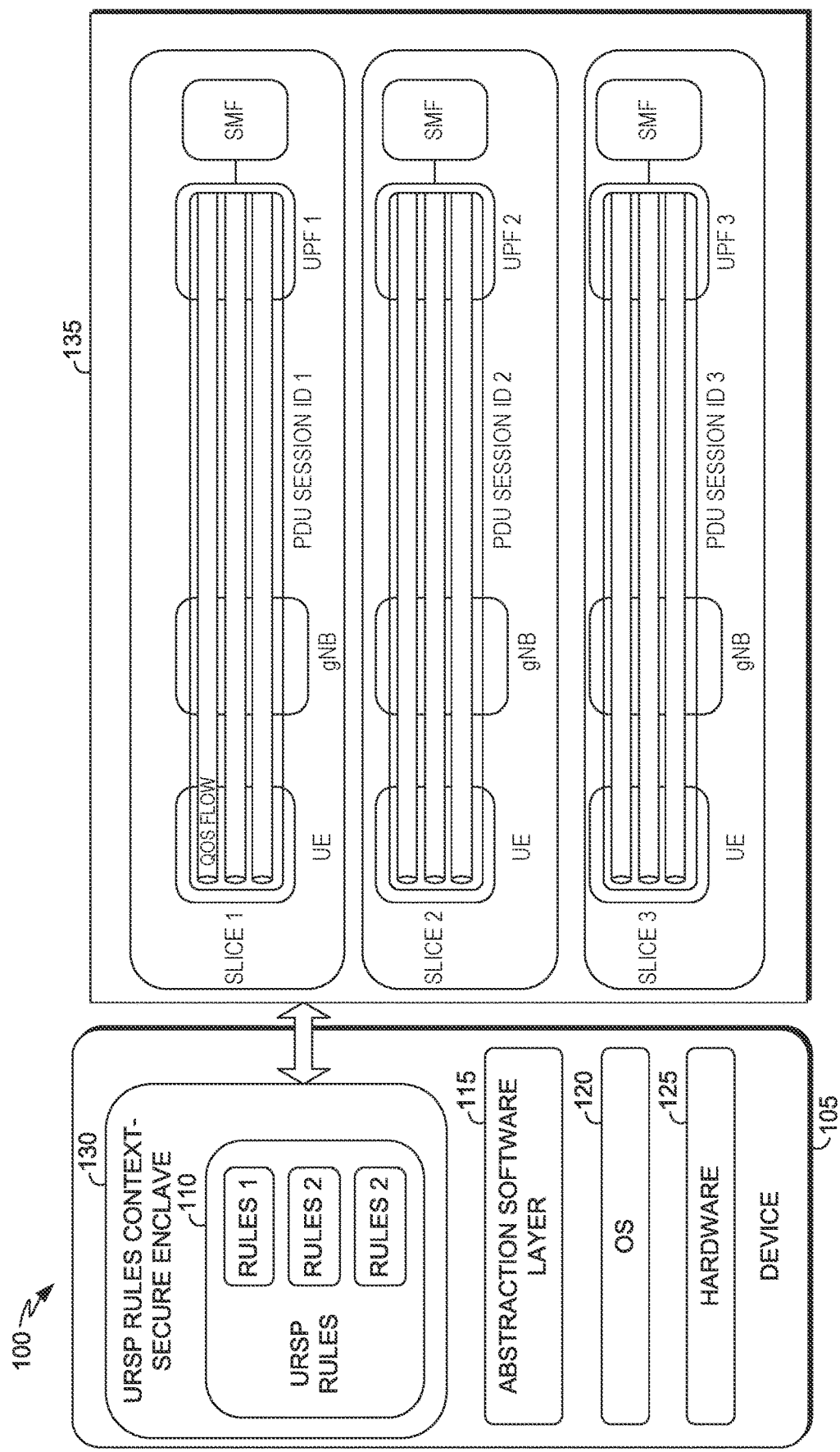
FIG. 1 illustrates a secure application programming interface (API) for remote management and configuration of a User Equipment Route Selection Policy (URSP) rule, according to an implementation of an embodiment of the present invention.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| 5GCN | 5G Core Network |
| Application ID | Application Identifier or Application Identity |
| API | Application Programming Interface |
| App OS | Application Operating System |
| BS | Base Station |

-continued

| | |
|---|---|
| BTS | Base Transceiver Station |
| CD-ROM | Compact Disk Read Only Memory |
| CDMA | Code Division Multiple Access |
| CDMA2000 | Code Division Multiple Access 2000 |
| DDOS | Distributed Denial of Service |
| DNN | Data Network Name |
| DVD | Digital Versatile Discs |
| EEPROM | Electrically Erasable Programmable Read Only Memory |
| eSIM | Embedded SIM |
| eNodeB | Evolved Node B |
| eUICC | Embedded Universal Integrated Circuit Card |
| FQDN | Fully Qualified Domain Name |
| gNB or gNodeB | Next Generation Node B |
| GPRS | General Packet Radio Service |
| GSM | Global System for Mobile communications |
| HMAC | Hashed Message Authentication Code |
| IP | Internet Protocol |
| LED | Light Emitting Diode |
| LPA | Local Profile Assistant |
| LTE | Long Term Evolution |
| MD | Mobile Device |
| ME | Mobile Equipment |
| MITM | Man In The Middle |
| OEM | Original Equipment Manufacturer |
| OS | Operating System |
| PC | Personal Computer |
| PCS | Personal Communications Service |
| PDU | Protocol Data Unit |
| QoS | Quality of Service |
| RAM | Random Access Memory |
| RF | Radio-Frequency |
| RFI | Radio-Frequency Interference |
| ROM | Read Only Memory |
| SIM | Subscriber Identity Module |
| SM-DP+ | Subscription Manager Data Preparation Platform |
| SMF | Session Management Function |
| SMS | Short Message Service |
| TDD | Time Division Duplex |
| TDMA | Time Division Multiple Access |
| TPM | Trusted Platform Module |
| TXRU | Transceiver (or Transceiver Unit) |
| UE | User Equipment |
| UICC | Universal Integrated Circuit Card |
| UPF | User Plane Function |
| URSP | User Equipment (UE) Route Selection Policy |
| UMTS | Universal Mobile Telecommunications Service |
| USIM | Universal Subscriber Identity Module |
| WCDMA | Wideband Code Division Multiple Access |
| WiMAX | Worldwide Interoperability for Microwave Access |

Further, various technical terms are used throughout this description.

In a first aspect, a method for User Equipment (UE) route selection policy (URSP) rule security is provided that includes receiving a set of URSP rules with traffic descriptors with criteria for matching the URSP rules to a packet sent by the UE. The criteria is based on at least a data network name (DNN), Application Identity (ID), fully qualified domain name (FQDN), and internet protocol (IP)-Tuple. Every time a packet is prepared for transmission, the URSP rules are validated by the UE before a match of the URSP rules is made to a protocol data unit (PDU) session. Content and signature of the URSP rules are verified that they have not been altered. An unaltered set of URSP rules has a known good hash signature. The known good hash signature is created with a hashed message authentication code (HMAC). If the URSP rules cannot be verified, a core network is accessed by the UE to request an update to the URSP rules. If the URSP rules are verified, the URSP rules are matched to the PDU session.

In a second aspect, a method for User Equipment (UE) Route Selection Policy (URSP) rule security is provided that includes receiving a set of URSP rules into the UE. An integrity of URSP rules associated with an application or network slices is protected in a mobile communication network. A digital signature of the URSP rules is validated. The validation of the digital signature comprises the digital signature is matched to an expected original digital signature of the URSP rules that are originally written into the UE. If the digital signature does not match, a new set of URSP rules is accessed from a policy control function (PCF) in the mobile communication network.

In a third aspect, a system for User Equipment (UE) route selection policy (URSP) rule security is provided. A UE is configured to receive a set of URSP rules with traffic descriptors with criteria for matching the URSP rules to a packet sent by the UE. The criteria is set based on at least a data network name (DNN), Application Identity (ID), fully qualified domain name (FQDN), and internet protocol (IP)-Tuple. Every time a packet is prepared for transmission, the UE validates the URSP rules before a match of the URSP rules is made to a protocol data unit (PDU) session. The system verifies that a content and signature of the URSP rules have not been altered. An unaltered set of URSP rules has a known good hash signature. The known good hash signature is created with a hashed message authentication code (HMAC). If the URSP rules cannot be verified, the UE accesses a core network to request an update to the URSP rules. If the URSP rules can be verified, the UE matches the URSP rules to the PDU session.

Implementations of embodiments of the present invention include a method for UE route selection policy rule security. URSP is used by the UE to determine if a detected application can be associated to an established PDU session/flow or trigger a new PDU session/flow. The UE will have a set of URSP rules with traffic descriptors with criteria for matching the rule to a packet being sent by the device. The descriptors criteria for matching or triggering on every user plane packet sent upstream can be based on DNN, Application ID, FQDN, and IP-Tuple. The URSP rules can be susceptible to malicious modification at the user level device. Hence, the device system context that hosts URSP rules needs to be protected from compromise. Specifically, the UE shall validate the rules before the matching the rules of any existing or new PDU session(s) every time a packet is prepared for transmission. The URSP content and signature can be checked to ensure the rules have not been tampered with. In one way, each set of URSP rules in a given device should have a known good hash signature that is deemed valid by the network until the time it gets updated by the network. For example, a hashed message authentication code (HMAC) can be used to determine a good hash signature. In another way, each set of URSP rules in a given device can use a digital signature that use an asymmetric cryptographic scheme. Furthermore, the URSP rules can be uploaded to the secure enclave (also known as a security enclave). If the URSP rules cannot be verified, then the UE accesses the core network to request an update to the rules (in this case the network is the source of authority of the rules and not the device), which will also provide availability in this case. The network or the device can be programmed to have a status synchronization check of the rules every period of time (e.g., every 24 hours). The periodic status check can be programmed depending upon the user device capabilities and the mobile operator requirements.

Only the URSP rules provisioned by the network (PCF) is used by the UE, if both URSP rules provisioned by the PCF and pre-configured URSP rules are present. If no URSP rule is provisioned by the PCF, and the UE has pre-configured rules configured in the Universal Subscriber Identity Module (USIM), then only the pre-configured URSP rules configured in the USIM can be used after they are validated by the methods described earlier. The USIM is not explained in detail here, but one of ordinary skill in the art understands the USIM is part of 5G technology and is one of several software applications in the UICC or eUICC.

In another embodiment, the UE consists of a mobile equipment (ME) and USIM. In this embodiment, if no URSP rules is provisioned by the PCF, and the UE has pre-configured rules URSP rules configured in the USIM and ME, then only the pre-configured URSP rules configured in the USIM can be used after they are validated by the methods described earlier.

URSP rule security includes integrity in protecting URSP rules context in the UE associated with applications or network slices on a mobile communication network. The context holding route selection policy, network, and traffic descriptors information must be integrity protected. A "crypto" solution can be used to wrap objects into a secure tamper proof container or a micro-service. The digital signature of the URSP operating rules must be validated by ensuring the rules signature match the expected original digital signature of the URSP rules when the rules were first written into the device. Then, there must be a secure API for remote management and configuration of the URSP rule.

Turning now to FIG. 1, a device (UE) 105 may include a set of URSP rules 110, an abstraction software layer 115, and operating system (OS) 120, and hardware 125. The set of URSP rules 110 may be enclosed in a secure enclave 130. The set of URSP rules 110 are respectively applied to a set of network slices 135. For example, in FIG. 1, rules 1 applies to slice 1, rules 2 applies to slice 2, and rules 3 applies to slice 3. As shown in FIG. 1, a network slice includes a Protocol Data Unit (PDU) session identification (ID) and session management function (SMF). The PDU session ID shows a quality of service (QoS) flow from a UE through a Next Generation Node B (gNB) to a User Plane Function (UPF). The SMF is primarily responsible for interacting with a data plane by creating, updating, and removing PDU sessions and managing session context with the UPF. The idea here is not to described these function in details, but to provide a brief introduction of the functions in term of the 5G technology. Details on each function may be obtained from the various 5G documents under the $3^{rd}$ Generation Partnership Project (3GPP).

The functions of secure enclave 130 includes the following: The UE includes support for secure enclave 130 functions as a software stack that is responsible for the URSP rules security aspects. Secure enclave 130 can be any hardened, tamper proof trusted execution environment, where secure enclave 130 is responsible for handling URSP rule sensitive information so that the URSP rule sensitive information is not handled by the application processor within the user device. Secure enclave 130 verifies the UE URSP rules operating context before matching for the application occurs (i.e. matching the URSP rule to the PDU session). Secure enclave 130 continuously ensures the integrity of the URSP rules by verifying the original rules stored in secure enclave 130 and the operating traffic descriptors are not compromised. When the UE fails to verify the URSP rules, the UE URSP secure enclave will securely contact the core network to update and/or refresh the rules list from a source of authority. Secure enclave 130 authorizes the triggering of the operational rules to take effect to maintain and control the PDU session connection with different network slices.

Figure 2:
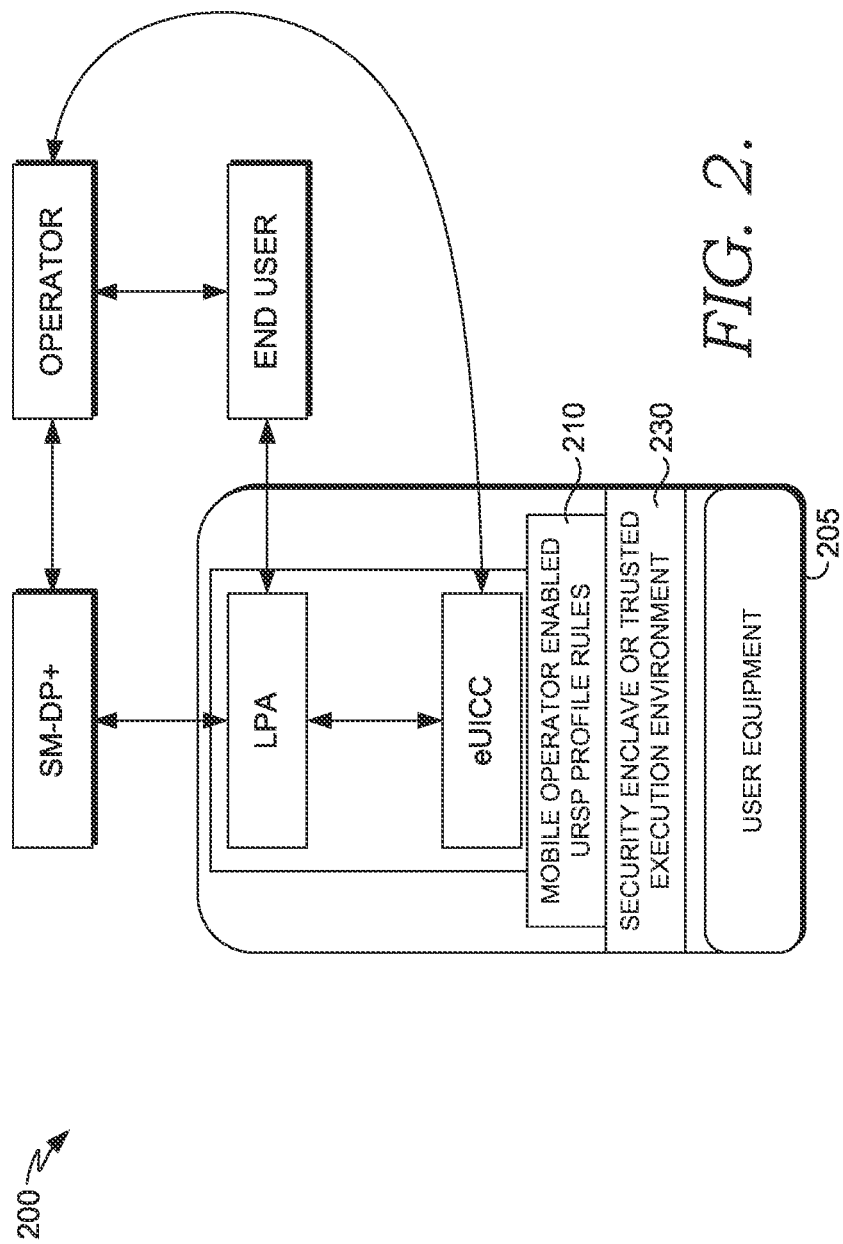
FIG. 2 illustrates network rules implemented into a user equipment (UE) profile, according to an implementation of an embodiment of the present invention.

Turning now to FIG. 2, an eSIM implementation 200 is shown as it would be implemented in 5G technology. With an implementation of embodiment of the present invention, URSP rules data 210 is implemented into a secure enclave 230. By having URSP rules data 210 and secure enclave 230 embedded in UE 205, the functionality shown in and described for FIG. 1 can be implemented. In essence, FIG. 2 shows the secure IP stack integration of the URSP rules.

The operator's Subscription Manager Data Preparation platform (SM-DP+) includes the embedded subscriber identification module (eSIM) subscription management server. The SM-DP+ aims at securely downloading the eSIM profile it stores onto the embedded Universal Integrated Circuit Card (eUICC). The SM-DP+ is an entity which operators use to securely encrypt their operator credentials for over the air installation within the SIM. The SM-DP+ securely packages profiles to be provisioned on the eUICC. The SM-DP+ manages the installation of these profiles onto the eUICC. Embedded SIM (eSIM, or eUICC) technology allows mobile users to download a carrier profile and activate a carrier's service without having a physical SIM card.

With an implementation of an embodiment of the present invention, the IP stack of the URSP rules 210 can be securely integrated at the UE level by doing the following:

The IP stack routes every packet to transmit or routes at least the key metadata to secure enclave 230 or Trusted Platform Module (TPM) with the URSP rules, and the TPM returns the route (flow) to route the packet.

The TPM can access via a shared memory the current set of rules used by the IP stack policy routing layer and at random time intervals will read the rules in shared memory to compare with the secure copy. If there is a mismatch, the TPM can initiate some recovery procedures. This validation can be suspended while the device is in an idle state and can be resumed on re-attachment or reconnection.

A validation check is made at an initial attachment or any time there is a change to the URSP rules in the device, not when the URSP rules change due to unavailable network slices.

Since the current native operating system (OS) does not allow an application to designate directly the required traffic descriptors, such as Application ID, DNN, etc., an OS generic extension library that is encrypted and requires a specialized key for decrypting the IP flows associated with the URSP rules can be implemented. The extended system library can be generic to be cross-compiled across different architecture and OS flavors.

Figure 3:
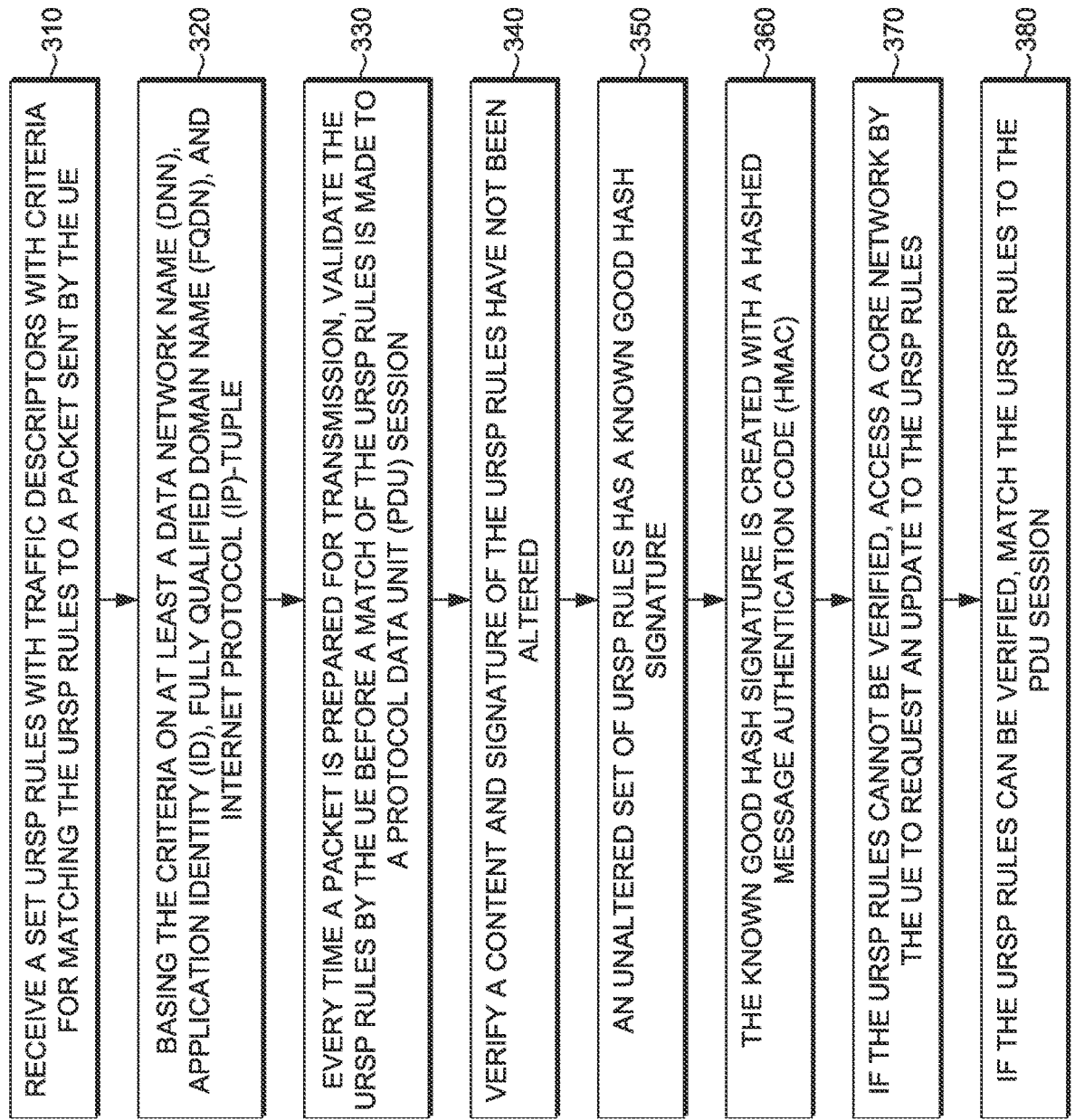
FIG. 3 illustrates a process for URSP rule security, according to an implementation of an embodiment of the present invention.

In FIG. 3, a process for User Equipment (UE) route selection policy (URSP) rule security is implemented in a method 300. In a step 310, URSP rules 110 are received with traffic descriptors with criteria for matching URSP rules 110 to a packet sent by UE 105. In a step 320, the criteria is based on a data network name (DNN), Application Identity (ID), a fully qualified domain name (FQDN), an internet protocol (IP)-tuple, or other criteria. Every time a packet is prepared for transmission, UE 105 validates URSP rules 110 before a match of URSP rules 110 is made to a protocol data unit (PDU) session, in a step 330. In a step 340, a content and signature of URSP rules 110 is verified to make sure they have not been altered. An unaltered set of URSP rules 110 has a known good hash signature, in a step 350. In a step 360, the known good hash signature is create with a hashed message authentication code (HMAC). In a step 370, if URSP rules 110 cannot be verified, UE 105 access a core network to request an update to URSP rules 110. If URSP rules 110 can be verified, URSP rules 110 are matched the PDU session.

Figure 4:
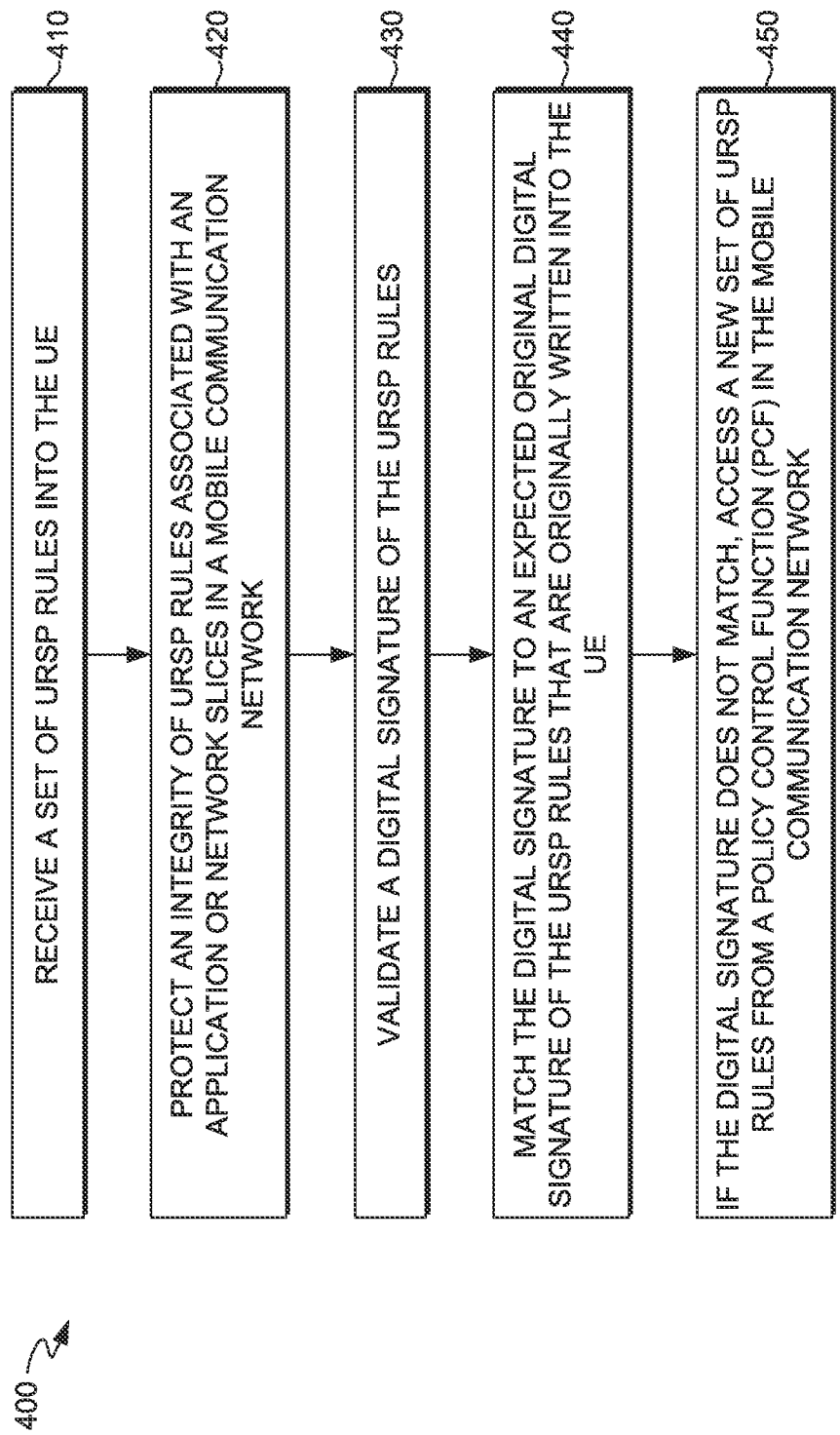
FIG. 4 illustrates another process for URSP rule security, according to an implementation of an embodiment of the present invention.

Turning now to FIG. 4, another process for User Equipment (UE) route selection policy (URSP) rule security is implemented in a method 400. In a step 410, UE 205 receives a set of URSP rules 210. In a step 420, an integrity of URSP rules 210 is protected for URSP rules 210 associated with an application or network slices 135 in a mobile communication network. A digital signature of URSP rules 210 is validated, in a step 430. In a step 440, the digital signature is matched to an expected original digital signature of URSP rules 210 that are originally written into UE 205. If the digital signature does not match, a new set of URSP rules 210 is accessed from a policy control function (PCF) in the mobile communication network, in a step 450.

Through various embodiments, a telecommunications provider, implementing 5G technology, can secure UE devices and better control access to network slices. Furthermore, telecommunications providers can license the secure enclave software stack to device vendors and other operators that want to have a solution implemented in devices connecting to their network.

The invention claimed is:

1. A method for User Equipment (UE) route selection policy (URSP) rule security, comprising:
   receiving a set of URSP rules with traffic descriptors with criteria for matching the URSP rules to a packet sent by the UE;
   every time a packet is prepared for transmission, validating the URSP rules by the UE before a match of the URSP rules is made to a protocol data unit (PDU) session;
   verifying a content and signature of the URSP rules have not been altered;
   when the URSP rules cannot be verified, accessing a mobile communication network by the UE to request an update to the URSP rules; and
   when the URSP rules can be verified, matching the URSP rules to the PDU session.

2. The method of claim 1, further comprising embedding the set of URSP rules in a secure enclave in the UE.

3. The method of claim 2, wherein the criteria is based on at least a data network name (DNN).

4. The method of claim 3, wherein the known good hash signature is created with a hashed message authentication code (HMAC).

5. The method of claim 2, wherein the criteria is based on at least an Application Identity (ID).

6. The method of claim 2, wherein the criteria is based on at least a fully qualified domain name (FQDN).

7. The method of claim 2, wherein the criteria is based on at least a data network name (DNN), Application Identity (ID), fully qualified domain name (FQDN), and internet protocol (IP)-Tuple.

8. The method of claim 2, wherein an unaltered set of URSP rules has a known good hash signature.

9. The method of claim 2, verifying a content and signature of the URSP rules have not been altered comprises verifying a digital signature that use an asymmetric cryptographic scheme.

10. A method for User Equipment (UE) Route Selection Policy (URSP) rule security, comprising:
    receiving a set of URSP rules into the UE;
    protecting an integrity of URSP rules associated with an application or network slices in a mobile communication network;
    validating a digital signature of the URSP rules; and
    when the digital signature does not match, accessing a new set of URSP rules from a policy control function (PCF) in the mobile communication network or, when the PCF does not provision the set of URSP rules and the UE has pre-configured URSP rules in both the USIM and a mobile equipment (ME), then accessing the set of URSP rules from the USIM.

11. The method of claim 10, further comprising embedding the set of URSP rules in a secure enclave in the UE.

12. The method of claim 11, wherein validating the digital signature comprises matching the digital signature to an expected original digital signature of the URSP rules that are originally written into the UE.

13. A system for User Equipment (UE) route selection policy (URSP) rule security, comprising:
    a UE configured to receive a set of URSP rules with traffic descriptors with criteria for matching the URSP rules to a packet sent by the UE;
    the criteria is set based on at least one of a data network name (DNN), Application Identity (ID), fully qualified domain name (FQDN), or internet protocol (IP)-Tuple;
    every time a packet is prepared for transmission, the UE validates the URSP rules before a match of the URSP rules is made to a protocol data unit (PDU) session;
    the system verifies a content and signature of the URSP rules have not been altered;
    when the URSP rules cannot be verified, the UE accesses a core network to request an update to the URSP rules; and
    when the URSP rules can be verified, the UE matches the URSP rules to the PDU session.

14. The system of claim 13, further comprising the set of URSP rules embedded in a secure enclave in the UE.

15. The system of claim 14, wherein an unaltered set of URSP rules has a known good hash signature.

16. The system of claim 14, wherein the known good hash signature is created with a hashed message authentication code (HMAC).

* * * * *